United States Patent Office 3,254,111
Patented May 31, 1966

3,254,111
ESTERS OF ALPHA-CYANOACRYLIC ACID AND PROCESS FOR THE MANUFACTURE THEREOF
Gary F. Hawkins and Hartsell F. McCurry, Kingsport, Tenn., assignors to Eastman Kodak Company, Rochester, N.Y., a corporation of New Jersey
No Drawing. Filed Dec. 9, 1960, Ser. No. 74,748
11 Claims. (Cl. 260—465.4)

This invention relates to the preparation of esters of α-cyanoacrylic acid and more particularly to the preparation of monomeric α-cyanoacrylates useful in adhesive compositions.

The monomeric form of an a-cyanoacrylate has in the past usually been prepared by depolymerization of a polymer thereof which is formed by reacting a cyanoacetate with formaldehyde or a polymer of formaldehyde in the presence of a basic condensation catalyst. Heretofore, the reaction between the cyanoacetate and the formaldehyde was effected in aqueous medium, usually by employing an aqueous solution of formaldehyde. A method of this kind was disclosed in Ardis, U.S. Patent 2,467,927.

The monomeric α-cyanoacrylates are readily polymerizable without the use of either heat or a catalyst, and it has consequently been difficult to store the monomer without premature polymerization. This is particularly true of the monomeric α-cyanoacrylates prepared from polymer made in aqueous medium, since the presence of even small amounts of water catalyzes the polymerization reaction and contributes to the instability of the monomer. It has been difficult to reduce the moisture content of the polymeric α-cyanoacrylates to a sufficiently low level prior to depolymerization to give monomers having good stability at room temperature in bulk. Furthermore, the presence of even small amounts of moisture has made the depolymerization reaction difficult to perform.

Recently an improved method has been developed for producing monomeric α-cyanoacrylates which insures the formation of substantially anhydrous polymeric α-cyanoacrylates without the necessity of subjecting the polymer to prolonged drying periods. In this improved method, equimolar quantities of formaldehyde and cyanoacetate are reacted in the presence of a basic condensation catalyst in solution with a nonaqueous organic solvent, such as a lower alkyl monohydric alcohol, which distills at a temperature below the depolymerization temperature of the polymer formed by the reaction. After the chemical reaction has been completed at least part of the solvent is removed by distillation. Then an organic solvent such as benzene, which is capable of forming an azeotrope with water, is added to the polymeric reaction mixture. The reaction solvent, water, and the azeotrope-forming solvent are distilled off as a ternary azeotrope and the water content of the polymer is reduced to a very low level. A substantially anhydrous, viscous, crude polymer is obtained as a residue. The polymer can be readily depolymerized by heating in the presence of a polymerization inhibitor without the necessity of further drying. The monomeric vapor evolved from the polymer is condensed and recovered as the α-cyanoacrylate product. This monomer has a low water content and, therefore, good stability against polymerization.

The recently developed process is a marked improvement over prior processes in yielding a product of low moisture content. However, we have now made a further improvement. In accordance with the present invention, we employ more than 1 mol and less than 2 mols of cyanoacetate per mol of formaldehyde in preparing the cyanoacrylate. We obtain a polymeric intermediate reaction product having an average composition of relatively low molecular weight and we subject the intermediate product to depolymerization under conditions such that the depolymerization product consists essentially of α-cyanoacrylate and α,α'-dicyanoglutarate. The latter is not decomposed to substantial extent. In the preferred embodiment it is recycled to the initial polymerization stage.

The chemical reaction occurring in our process is illustrated by the following over-all reaction equation:

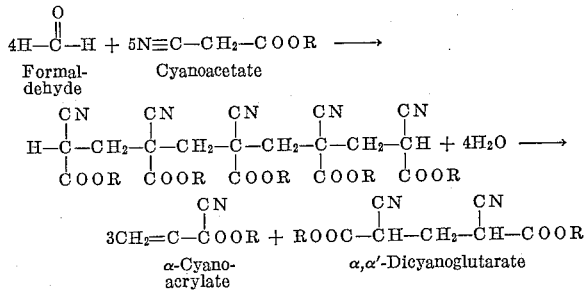

where R=alkyl, alkenyl, cyclohexyl or aryl.

A number of important advantages are obtained by our new procedure. One unexpected result is that the intermediate polymeric product is much less viscous than the intermediate obtained in the prior processes. In our process the intermediate product is sufficiently fluid to eliminate the need for heat transfer agents or solvents other than an azeotrope-forming solvent such as benzene. Thus, our process does not require the use of an alcohol-type reaction solvent for the polymerization reaction nor the addition of a diluent such as tricresyl phosphate to the polymeric intermediate product. Our intermediate product is sufficiently fluid that there is no difficulty of agitation or of heat transfer. A uniform temperature can readily be maintained throughout the reaction mixture with the result that the uniformity or purity of the ultimate product is improved. Furthermore, a consistent yield and quality of product can be obtained in different runs. The time required to carry out the process is reduced. Still further, by eliminating the inert solvents previously required we obtain a higher production of desired product for a reaction vessel of given size.

The use of a mol ratio of less than two mols of cyanoacetate per mol of formaldehyde also leads to an important advantage in our new process. As we have indicated, the products obtained by depolymerizing the intermediate polymeric product of our process comprise the desired cyanoacrylate monomer and a higher boiling material consisting essentially of α,α'-dicyanoglutarate. The latter boils sufficiently higher than the desired monomeric product that the monomer can be recovered in high purity by subatmospheric distillation. This provides an important advantage over the type of process in which cyanoacetate is reacted with formaldehyde in a 2:1 mol ratio. The latter type of process produces an intermediate product that consists essentially of dicyanoglutarate, instead of the characteristic polymeric intermediate product of our process. When the intermediate product consists entirely of the glutarate, the glutarate must be decomposed in order to obtain the desired monomeric cyanoacrylate. However, decomposition of the glutarate to obtain the desired α-cyanoacrylate produces one mol of cyanoacrylate and one mole of cyanoacetate. Because of their close boiling points it is difficult to separate the cyanoacrylate in high purity from the cyanoacetate by distillation. In contrast, in our process we avoid the decomposition of the α,α'-dicyanoglutarate and consequently high purity cyanoacrylate monomer can be recovered by distillation of the depolymerization product.

The novel procedure of our invention that produces the described advantages, in general, comprises reacting a cyanoacetate with formaldehyde in a molar ratio of more than one mol but less than two mols of cyanoacetate per mol of formaldehyde in solution with a nonaqueous organic solvent such as benzene that forms an azeotrope with water and in the presence of a basic condensation catalyst. Water is azeotropically distilled from the reaction mixture and a polymeric intermediate reaction product is obtained. The polymeric product is then subjected to depolymerization conditions and the resulting depolymerization product is distilled to recover an overhead product comprising the desired α-cyanoacrylate. The residue comprises α,α′-dicyanoglutarate. In the preferred embodiment of the invention, the latter is recycled to the initial polymerization stage.

The reaction equation above demonstrates the preferred embodiment of our process in which we react 4 mols of formaldehyde with 5 mols of alkyl cyanoacetate to obtain an intermediate polymeric product that depolymerizes to 3 mols of α-cyanoacrylate and 1 mol of α,α′-dicyanoglutarate. An essential feature of our process is that more than one mol but less than two mols of cyanoacetate is employed per mol of formaldehyde. This makes possible the formation of our characteristic polymeric intermediate, which is a copolymer of one molecule of α,α′-dicyanoglutarate with one or more molecules of an α-cyanoacrylate, and avoids formation of a long chain viscous homopolymer of α-cyanoacrylate. To obtain the copolymer of the glutarate with the cyanoacrylate, it is necessary to react "$n+1$" molecules of the cyanoacetate with "$n$" molecules of formaldehyde, "$n$" being at least 2. The copolymer can then be decomposed to yield one mol of dicyanoglutarate and "$n-1$" mols of cyanoacrylate. For example, 5 molecules of cyanoacetate react with 4 molecules of formaldehyde to yield a polymer that decomposes to 3 mols of cyanoacetate and 1 mol of glutarate; 3 molecules of cyanoacetate react with 2 mols of formaldehyde to yield a copolymer that decomposes to 1 mol of cyanoacrylate and 1 mol of cyanoglutarate; 6 mols of cyanoacetate react with 5 mols of formaldehyde to yield a copolymer that decomposes to 4 mols of cyanoacrylate and 1 mol of cyanoglutarate; etc. Thus, to obtain the desired intermediate with minimum yield of other products the mol ratio of alkyl cyanoacetate to formaldehyde is greater than 1:1 but no greater than 1.5:1.

If the molar ratio of cyanoacetate to formaldehyde exceeds 1.5:1, stoichiometric considerations indicate that the intermediate reaction product will be a mixture of the dicyanoglutarate and the copolymer of the cyanoacrylate with the glutarate. Although the copolymer in the mixture can be depolymerized to yield cyanoacrylate that can be separated by distillation from the undecomposed glutarate, the yield of cyanoacrylate in relation to the yield of glutarate is too low. In other words the reactants are not used as efficiently as possible for producing the desired product. Therefore, while the scope of our invention extends to the use of molar ratios higher than 1.5:1 (but less than 2:1) the preferred embodiment of our process, and that in which the greatest benefits of the invention are obtained, employs a molar ratio of alkyl cyanoacetate to formaldehyde no greater than 1.5:1.

The molar ratio of the reactants should not approach too closely to 1:1 or the proportion of α-cyanoacrylate in the intermediate copolymer with the glutarate will be excessive, the chain will be too long and an excessively viscous intermediate will be obtained, as in the prior equimolar process. We prefer to form an intermediate that is a copolymer of 1 molecule of the dicyanoglutarate with 3 molecules of the cyanoacrylate although an intermediate of somewhat longer chain, e.g., a copolymer of 1 molecule of the glutarate with 4 molecules of the acrylate is satisfactory, but a polymer of chain length greater than this may be excessively viscous. Thus, we have found that an undesirably viscous intermediate is obtained in reacting 5 mols of cyanoacetate with 4¼ mols of formaldehyde (1.175:1 mol ratio). Therefore, the molar ratio of cyanoacetate to formaldehyde is preferably in the range of 1.2:1 to 1.5:1. Most preferably the ratio is 1.25:1, which is obtained by the use of 5 mols of cyanoacetate with 4 mols of formaldehyde.

In a preferred embodiment of our process the α,α′-dicyanoglutarate recovered from the depolymerization product is recycled to the initial polymerization stage. In determining the mol ratio of reactants for the initial stage in the recycle operations, the glutarate should be considered as the equivalent of 2 mols of cyanoacetate and 1 mol of formaldehyde. Thus, for obtaining the equivalent of the preferred ratio of 5 mols of cyanoacetate to 4 mols of formaldehyde when 1 mol of dicyanoglutarate is recycled to the initial reaction stage, the actual proportion of reactants should be: 1 mol of dicyanoglutarate, 3 mols of cyanoacetate, and 3 mols of formaldehyde. Throughout the specification and claims we intend that any specified mol ratio of cyanoacetate to formaldehyde be construed as covering the equivalent ratio obtainable by substituting 1 mol of the corresponding dicyanoglutarate for 2 mols of the cyanoacetate and 1 mol of formaldehyde.

An important feature of our process is that the α,α′-dicyanoglutarate obtained by depolymerization of the intermediate product is not substantially decomposed and, in the preferred embodiment of the process, is recycled to the initial polymerization stage. Another procedure within the scope of the invention is to react the glutarate with formaldehyde alone or with cyanoacetate and formaldehyde in a reaction zone apart from the initial polymerization reaction zone. In these reactions, the molar ratio of reactants should also be such as to yield an intermediate product that is a copolymer of one molecule of the dicyanoglutarate with one or more molecules (preferably no more than four) of the α-cyanoacrylate.

The process of the invention is applicable for preparing many of the low molecular weight esters of α-cyanoacrylic acid. Thus any low molecular weight cyanoacetate can be used for the reaction. The α-cyanoacrylates which are of greatest utility, particularly for use as adhesive compositions, are those which are alkyl, alkenyl, cyclohexyl, or phenyl esters of α-cyanoacrylic acid. Consequently, the process preferably employs an alkyl cyanoacetate, an alkenyl cyanoacetate, a cyclohexyl cyanoacetate, or a phenyl cyanoacetate. The alkyl esters are desirably those in which the alkyl group contains from 1 to about 8 carbon atoms, with the lower alkyl esters containing from 1 to 4 carbon atoms being preferred. Thus, for example, the cyanoacetate is preferably methyl cyanoacetate, ethyl cyanoacetate, propyl cyanoacetate, butyl cyanoacetate, vinyl cyanoacetate, allyl cyanoacetate, cyclohexyl cyanoacetate, or phenyl cyanoacetate. The cyanoacetate is reacted with formaldehyde, and in this application the term "formaldehyde" is intended to include formaldehyde itself, as well as the polymer thereof such as p-formaldehyde or the like, but is not intended to include aqueous solutions of formaldehyde as typified by Formalin.

The reaction between the cyanoacetate and the formaldehyde to form a polymeric α-cyanoacrylate is readily effected by heating the reaction mixture to a temperature of about 50 to 90° C. in the presence of a basic catalyst. Many basic condensation catalysts are known, and any of such materials can be used to catalyze the reaction. Thus the catalyst can be any basic material, including the inorganic bases such as sodium or potassium hydroxide, ammonia, or ammonium hydroxide, the organic bases such as quinoline, piperidine, isoquinoline, dialkyl amines such as diethyl amine, alkali metal alkoxides such as sodium or potassium methoxide or ethoxide, or similar well known basic material. The amount of catalyst is not critical and can be varied if desired. Ordinarily, a very small amount of the basic material such as about 0.001 to 0.5 percent by weight is adequate, however, larger amounts can be used but are not usually advantageous.

The initial reaction between the cyanoacetate and formaldehyde is carried out in the presence of a nonaqueous organic solvent which is capable of forming an azeotrope with water. It is necessary that the azeotrope solvent distill at a temperature below the depolymerization temperature of the intermediate polymeric product. A number of volatile organic solvents are suitable therefore because depolymerization is usually effected by heating the polymeric product at a temperature of the order of 100 to 185° C. under a vacuum of the order of 1–3 mm. Hg. Benzene is greatly preferred as the azeotrope-forming solvent because it provides a suitable temperature of distillation. Other suitable solvents include toluene and heptane.

The polymeric intermediate product obtained in the first stage of our process is substantially anhydrous. Depolymerization is effected by heating the polymer at low pressure and in the presence of a polymerization inhibitor. Because of the inherent polymerization reactivity of the monomeric α-cyanoacrylates, it is desirable to depolymerize the intermediate product in the presence of a polymerization inhibitor, even though the low water content of the polymer results in a monomer of greater stability than that produced by reaction in an aqueous medium.

We preferably employ inhibitors both for ionic and free-radical polymerization. However, the more important of the two types of inhibitors are the acidic substances that inhibit ionic polymerization. Various suitable inhibitors include polyphosphoric acid, phosphorous pentoxide, antimony pentoxide, picric acid, hydroquinone, t-butyl catechol, metaphosphoric acid, maleic anhydride, ferric chloride, and the like. A particularly desirable group of polymerization inhibitors are the acidic gaseous inhibitors such as sulfur dioxide, nitric oxide, hydrogen fluoride, and the like. Usually it is desirable to include a nonvolatile inhibitor in the vessel and also to collect the depolymerization vapors in a receiving vessel also containing a nonvolatile polymerization inhibitor. During depolymerization and redistillation it is also preferred to introduce in to the system a stream of gaseous inhibitor which mixes with the monomeric vapors evolved and dissolves in the monomeric product, at least to some extent, when the vapor is condensed. Phosphorous pentoxide and polyphosphoric acid are the preferred nonvolatile inhibitors for the depolymerization stage, and sulfur dioxide is the preferred gaseous inhibitor. A particularly stable monomeric product is obtained when the receiving vessel contains a small amount of hydroquinone, whereby the monomer product obtained contains a mixture of sulfur dioxide and hydroquinone.

The monomeric α-cyanoacrylic esters prepared in accordance with this invention are excellent adhesive compositions for bonding almost any type of material to itself or to a dissimilar material. The adhesive compositions are readily employed by merely spreading them in a thin film on the surface to be bonded. Polymerization occurs within a few seconds without the use of either heat or a polymerization catalyst, and the bonds which are obtained are of very high strength.

A further understanding of our invention will be had heat or a polymerization catalyst, and the bonds which are set forth to illustrate certain preferred embodiments.

*Example 1*

To 332 parts (2.65 moles) of allyl cyanoacetate, 250 parts of benzene, 1 part piperidine and 1 part of a 50% solution of sodium hydroxide in a 1-liter, stirred flask, fitted with a Dean-Stark tube was added 65 parts (2.16 moles) of para-formaldehyde in 4 portions while refluxing to remove the water formed. After substantially all of the water of reaction had been removed the major portion of the benzene was distilled out. About 30 parts of a mixture of equal parts of 85% phosphoric acid and phosphorus pentoxide along with 1 part of hydroquinone were then added. The remainder of the benzene was distilled out under subatmospheric pressure. A good vacuum was applied and the flask was heated further causing the depolymerization products to distill into a flask containing a little hydroquinone and $P_2O_5$. Most of the product distilled at 170–180° C. at a pressure of 5 to 6 mm. of mercury. The distillate was redistilled in a stream of $SO_2$ at a pot temperature of 70° C. at a pressure of 1 to 2 mm. of mercury. Distillation was discontinued when the pot temperature started to rise in order to prevent the distillation of diallyl α,α'-dicyanoglutarate. There was obtained 135 parts of allyl cyanoacrylate having good stability and adhesive properties.

The following example indicates yields obtainable in preparing methyl α-cyanoacrylate according to one modification of the process of our invention, the polymerization reaction being carried out at the reflux temperature of benzene, i.e., about 80 to 90° C.

*Example 2*

To 495 parts (5 mols) of methyl cyanoacetate, 100 parts of benzene, 0.2 part of piperidine and 5.5 parts of 9% sodium hydroxide contained in a 1-liter, stirred flask, fitted with a Dean-Stark tube was added 120 parts (4 mols) of paraformaldehyde in 4 portions while refluxing to remove the water formed. After all the water of reaction was removed, 5 parts of 85% phosphoric acid, 10 parts of phosphorus pentoxide and 10 parts of hydroquinone were added. The benzene was then distilled out, vacuum was applied and product was distilled in a stream of $SO_2$ into a flask containing a little hydroquinone and $P_2O_5$. Distillation was continued until a pot temperature of about 175° C. was reached. The distillate was redistilled in a stream of $SO_2$, the first cut coming over at 39–44° C. and a pressure of about 1 mm. of mercury, giving 270 parts of methyl α-cyanoacrylate. The second cut boiled at 155–165° C./1–2 mm., giving 110 parts of this material, which was essentially dimethyl α,α'-dicyanoglutarate. The yield of 270 parts of methyl α-cyanoacrylate amounted to approximately 2.45 mols. The theoretical yield by reaction of 5 mols of methyl cyanoacetate with 4 mols of formaldehyde is 3 mols of methyl α-cyanoacrylate plus 1 mol of dimethyl α,α'-dicyanoglutarate. Therefore, the actual yield of the desired monomer was about 81% of theory. The methyl α-cyanoacrylate obtained in the run was very active as an adhesive.

We have indicated that the dicyanoglutarate obtained by depolymerization of the intermediate reaction product can be recycled to the initial reaction zone for reaction with cyanoacetate and formaldehyde or can be reacted with formaldehyde alone to yield again a copolymer of cyanoacrylate with the glutarate, which is then depolymerized to obtain the cyanoacrylate.

The following example describes a run in which the dicyanoglutarate was reacted with paraformaldehyde to obtain the α-cyanoacrylate.

*Example 3*

348 parts of high boiler obtained from runs such as Example 2, which consisted essentially of dimethyl α,α'-cyanoglutarate (1⅔ mols), and 30 parts of paraformaldehyde (1 mol of formaldehyde) were placed in a 1-liter flask with 0.2 part piperidine, 5.5 parts of 9% NaOH, and 100 parts of benzene. The mixture was refluxed until all of the water was removed. Then the distillation of benzene, the depolymerization of the intermediate product, and redistillation were carried out substantially as described in Example 2 to obtain 181.7 parts of methyl cyanoacrylate. The reaction of 1⅔ mols of dimethyl α,α'-dicyanoglutarate with 1 mol of formaldehyde is proportionally equivalent to the reaction of 5 mols of methyl cyanoacetate with 4 mols of formaldehyde, and theoretically will yield 2 mols of methyl α-cyanoacrylate and ⅔ mol of dicyanoglutarate. Consequently, the yield of 181.7 parts of methyl α-cyanoacrylate (1.64 mols) was about 82% of theory.

The following example describes results obtained in a run carried out by adding a slurry of feed mixture to the reaction mixture in the reaction vessel as in Example 1.

*Example 4*

To 594 parts (6 mols) of methyl cyanoacetate, 200 parts of benzene and 1 part of piperidine contained in a 2-liter flask and heated to 75° C. was added slowly a slurry composed of 396 parts (4 mols) of methyl cyanoacetate and 247 parts (8 mols) of paraformaldehyde. The dropping funnel through which the slurry was added was washed with 200 parts of benzene. The reaction mixture was refluxed until all of the water was removed as the azeotrope. Fifteen parts of $P_2O_5$ and 10 parts of hydroquinone were then added and the reaction mixture worked up as in Example 2. The yield of monomeric methyl α-cyanoacrylate was 620 parts (5.6 mols). Theoretical yield for reaction of 10 mols of cyanoacetate with 8 mols of formaldehyde is 6 mols of α-cyanoacrylate plus 2 mols of dicyanoglutarate. Therefore, the actual yield of α-cyanoacrylate was about 93% of theory. The yield of high boiler, consisting essentially of dimethyl α,α'-dicyanoglutarate, was 330.5 parts or 79%.

The following example describes a run in which the residual reaction product of the process, i.e., the dicyanoglutarate, is reacted with methyl cyanoacetate and formaldehyde to obtain the desired cyanoacrylate.

*Example 5*

To 210 parts of high boiler (1 mol of dimethyl α,α'-dicyanoglutarate) from previous runs, 100 parts (1 mol) of methyl cyanoacetate, 100 parts of benzene and 0.25 part of piperidine in a 1-liter flask was slowly added at reflux a slurry composed of 90 parts of paraformaldehyde and 197 parts (2 mols) of methyl cyanoacetate. After all of the water had been azeotroped off, 10 parts of $P_2O_5$ and 5 parts of hydroquinone were added. The reaction mixture was worked up as in Example 2 to produce 329.6 parts (2.97 mols) of methyl α-cyanoacrylate product. The reaction of 1 mol of dicyanoglutarate with 3 mols of cyanoacetate and 3 mols of formaldehyde is equivalent to a 5:4 mol ratio of cyanoacetate:formaldehyde and gives a theoretical yield of three mols of α-cyanoacrylate. Therefore, the actual yield in this run was about 99% of theoretical and demonstrates the efficacy of recycling the glutarate to the reaction of the cyanoacetate with formaldehyde.

The following example describes a run according to the invention which employed another cyanoacetate of the preferred class of cyanoacetates, i.e., the lower alkyl cyanoacetates of which the alkyl groups have from 1 to 4 carbon atoms.

*Example 6*

To a mixture of 405 parts (2.9 mols) of isobutyl cyanoacetate, 200 parts of benzene, 0.5 part piperidine, and 5 parts of 10% sodium hydroxide solution, at reflux, was added a slurry of 123.5 parts (4 mols) of paraformaldehyde in 300 parts (2.1 mols) of isobutyl cyanoacetate. The residue from the slurry was washed into the flask with 100 parts of benzene. Refluxing was continued until all of the water came off as an azeotrope. The reaction mixture was cooled slightly and 3 parts of 85% phosphoric acid, 15 parts of phosphorous pentoxide and 10 parts of hydroquinone were added. The benzene was removed and the reaction mixture was distilled to produce 675 parts of crude product. This crude material was redistilled, with fractionation, in the presence of sulfur dioxide and phosphorus pentoxide to produce 250 parts of isobutyl α-cyanoacrylate product and 398 parts of high boiler.

The invention has been described in considerable detail with particular reference to certain preferred embodiments thereof, but it will be understood that variations and modifications can be effected within the spirit and scope of the invention as described hereinabove, and as defined in the appended claims.

We claim:
1. Allyl α-cyanoacrylate.
2. The process for preparing a monomeric α-cyanoacrylate of the formula,

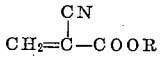

which comprises reacting a cyanoacetate of the formula, $NCCH_2COOR$ with formaldehyde in a molar ratio of more than one but less than two mols of cyanoacetate per mol of formaldehyde, obtaining an intermediate product that is a copolymer of said α-cyanoacrylate and the corresponding α,α-dicyanoglutarate of the formula,

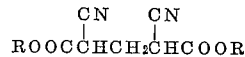

heating said intermediate product to a temperature sufficiently high to depolymerize said copolymer to a mixture of said α-cyanoacrylate and said glutarate and recovering said α-cyanoacrylate from said mixture without substantially decomposing said glutarate, wherein R is selected from the group consisting of alkyl of 1 to 8 carbon atoms, lower alkenyl, cyclohexyl and phenyl.

3. The process according to claim 2 in which the molar ratio of cyanoacetate to formaldehyde is in the range of 1.2:1 to 1.5:1.

4. The process for preparing a monomeric α-cyanoacrylate of the formula,

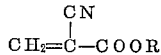

which comprises reacting a cyanoacetate of the formula, $NCCH_2COOR$, with formaldehyde in a molar ratio of more than one but less than two mols of cyanoacetate per mol of formaldehyde at a temperature of 50° to 90° C. and in the presence of a basic condensation catalyst and a nonaqueous organic solvent that forms an azeotrope with water, azeotropically distilling water of reaction and said organic solvent from the reaction mixture to obtain a substantially anhydrous intermediate polymeric reaction product, heating said intermediate product in the presence of a polymerization inhibitor to a temperature sufficiently high to depolymerize said intermediate product to a mixture of said α-cyanoacrylate and α,α'-dicyanoglutarate of the formula,

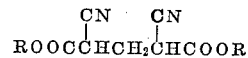

and separating said α-cyanoacrylate from said glutarate by distillation, wherein R is selected from the group consisting of alkyl of 1 to 8 carbon atoms, lower alkenyl, cyclohexyl and phenyl.

5. The process of claim 4 in which the ratio of cyanoacetate to formaldehyde is in the range 1.2:1 to 1.5:1.

6. The process for preparing a monomeric α-cyanoacrylate of the formula,

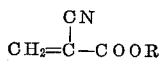

which comprises in an initial reaction stage reacting a cyanoacetate of the formula, $NCCH_2COOR$, with formaldehyde in a molar ratio of cyanoacetate to formaldehyde in the range of 1.2:1 to 1.5 to 1 at a temperature of 50 to 90° C. and in the presence of a basic condensation catalyst and a nonaqueous organic solvent from the group consisting of benzene, toluene and heptane, azeotropically distilling water of reaction and said solvent from the reaction mixture and recovering a substantially anhydrous intermediate product that is a copolymer of said α-cyanoacrylate and α,α'-dicyanoglutrate of the formula,

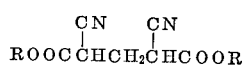

heating said intermediate product in the presence of an acidic polymerization inhibitor to a temperature sufficiently high to depolymerize said intermedaite product to a mixture of said α-cyanoacrylate and said α,α'-dicyanoglutarate, without substantially decomposing said glutarate, and distilling from the reaction zone a mixture of said α-cyanoacrylate and said α,α'-dicyanoglutarate, redistilling said latter mixture recovered as distillate from said latter distillation step, recovering said monomeric α-cyanoacrylate as the overhead product without substantially decomposing said α,α'-dicyanoglutarate and recycling said α,α'-dicyanoglutarate to the initial reaction stage, wherein R is lower alkyl.

7. The process for preparing monomeric methyl cyanoacrylate which comprises reacting methyl cyanoacetate with formaldehyde in a molar ratio of about 1.25 mols of α-cyanoacetate per mol of formaldehyde at a temperature of 80 to 90° C. and in the presence of a basic condensation catalyst and benzene, azeotropically distilling water of the reaction and benzene from the reaction mixture at atmospheric pressure to obtain a substantially anhydrous intermediate product that is copolymer of methyl α-cyanoacrylate with dimethyl α,α'-dicyanoglutarate, heating said intermediate product in the presence of an acidic polymerization inhibitor to a temperature sufficiently high to depolymerize said intermediate product to a mixture of methyl α-cyanoacrylate and dimethyl α,α'-dicyanoglutarate, distilling said mixture from the reaction zone at subatmospheric pressure, redistilling said mixture recovered as distillate from said latter distillation step without decomposing said dimethyl α,α'-dicyanoglutarate, recovering as the overhead product monomeric methyl α-cyanoacrylate, and thereafter reacting said dimethyl α,α-dicyanoglutrate with a reactant selected from the group consisting of formaldehyde and a mixture of formaldehyde and said methyl cyanoacetate to form said copolymer intermediate reaction product.

8. The process of claim 7 in which the dimethyl α,α'-dicyanoglutarate is recycled to the initial reaction stage.

9. The process of claim 7 in which the dimethyl α,α'-dicyanoglutarate is thereafter reacted with formaldehyde to form said copolymer intermediate reaction product.

10. The process of claim 7 in which the dimethyl α,α'-dicyanoglutarate is thereafter reacted with a mixture of formaldehyde and said methyl cyanoacetate to form said copolymer intermediate reaction product.

11. The process for preparing an α-cyanoacrylate of the formula,

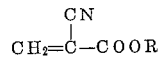

which comprises reacting an α,α'-dicyanoglutarate of the formula,

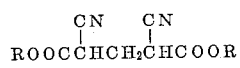

with a reactant selected from the group consisting of formaldehyde and a mixture of formaldehyde and cyanoacetate of the formula, NCCH$_2$COOR, to obtain an intermediate product that is a copolymer of the α-cyanoacrylate with the α,α'-dicyanoglutarate, heating said copolymer in the presence of a polymerization inhibitor at a temperature sufficiently high to depolymerize said copolymer, and separating said α-cyanoacrylate from the depolymerization product without substantially decomposing the α,α'-dicyanoglutarate, wherein R is lower alkyl.

References Cited by the Examiner
UNITED STATES PATENTS

| | | | |
|---|---|---|---|
| 2,338,834 | 1/1944 | Britton et al. | 260—465.4 |
| 2,467,927 | 4/1949 | Ardis | 260—465.4 |
| 2,624,751 | 1/1953 | Mowry. | |
| 2,628,164 | 2/1953 | Mowry et al. | 260—465.4 X |
| 2,721,858 | 10/1955 | Joyner et al. | 260—465.4 X |
| 2,776,232 | 1/1957 | Shearer et al. | 260—465.4 X |
| 3,036,066 | 5/1962 | Sims | 260—465.4 X |

CHARLES B. PARKER, *Primary Examiner.*